United States Patent [19]   [11] Patent Number: 4,955,465
Straight et al.   [45] Date of Patent: Sep. 11, 1990

[54] ENDLESS FLEXIBLE CONVEYOR BELT AND STACKER PLATES THEREFOR

[75] Inventors: Michael R. Straight; Jack R. Raum, both of Winchester, Va.

[73] Assignee: Ashworth Bros., Inc., Fall River, Mass.

[21] Appl. No.: 406,348

[22] Filed: Sep. 12, 1989

Related U.S. Application Data

[63] Continuation-in-part of Ser. No. 224,696, Jul. 27, 1988, which is a continuation-in-part of Ser. No. 171,390, Mar. 21, 1988, Pat. No. 4,867,301, which is a continuation-in-part of Ser. No. 83,272, Aug. 10, 1987, abandoned, and a continuation-in-part of Ser. No. 213,171, Jun. 29, 1988, which is a continuation-in-part of Ser. No. 171,390, Mar. 21, 1988, Pat. No. 4,867,301, and a continuation-in-part of Ser. No. 83,272, Aug. 10, 1987, abandoned.

[51] Int. Cl.⁵ .............................................. B65G 21/18
[52] U.S. Cl. ..................................... 198/778; 198/852
[58] Field of Search .............. 198/778, 831, 815, 841, 198/852, 853; 62/381; 34/147, 162; 99/443 C

[56] References Cited

U.S. PATENT DOCUMENTS 3,938,651  2/1976  Alfred et al. .......................... 198/778
4,450,953  5/1984  LeCann et al. ....................... 198/778
4,565,282  1/1986  Olsson et al. ......................... 198/778
4,603,776  8/1986  Olsson .................................. 198/778
4,858,750  8/1989  Cawley ................................. 198/778
4,867,301  9/1989  Roinestad et al. ................... 198/778
4,875,343  10/1989  Jeppson .............................. 198/778

FOREIGN PATENT DOCUMENTS

303457  2/1989  European Pat. Off. ............. 198/778
WO89/08808  9/1989  World Int. Prop. O. .......... 198/778

Primary Examiner—Joseph E. Valenza
Attorney, Agent, or Firm—Banner, Birch, McKie and Beckett

[57] ABSTRACT

A spacer plate for a conveyor belt having transverse rods and support links. The spacer plate has a longitudinal portion having upper and lower sections, a pair of tab portions extending in opposite transverse directions from upper ends of the upper section, and a pair of through holes through lower ends off the lower sections for receiving ends of the transverse rods. The lower section has a member extending generally out from the plane of the upper section and bent to define a C-shape in a member plane perpendicular to the plane of the upper section. The C-shape member has a pair of arms through which the through holes pass.

4 Claims, 10 Drawing Sheets

ENDLESS FLEXIBLE CONVEYOR BELT AND STACKER PLATES THEREFOR

CROSS-REFERENCE TO RELATED APPLICATIONS

This is a continuation-in-part of copending application Ser. No. 07/224,696, filed July 27, 1988, which is a continuation-in-part of copending applications (1) Ser. No. 07/171,390, filed Mar. 21, 1988, now U.S. Pat. No. 4,867,301 which in turn is a continuation-in-part of application Ser. No. 07/083,272, filed Aug. 10, 1987, now abandoned, and (2) Ser. No. 07/213,171, filed June 29, 1988, which in turn is a continuation-in-part of the 171,390 and 083,272 applications.

A corresponding European Patent Application No. 88,307,384.3 was published as Publication No. 0.303.475.A1, and its entire contents are hereby incorporated by reference.

BACKGROUND OF THE INVENTION

This invention relates to endless conveyor belt systems wherein the belts are driven in a helical path. These systems convey products of various kinds through a confined space for a certain amount of time for treating the products, as by heating, drying, cooling or freezing them. Since these systems satisfy rigorous hygiene requirements, they are well suited for handling food products.

The conveyor belt as it travels along the superimposed, helically extending belt tiers can be self-supporting on one or both of its edges. By having the spiral conveyor belt being self-supporting, framework across the belt for supporting the belt is not needed. This framework occupies valuable product carrying space. Eliminating the framework reduces the height between the tiers and the overall height of the spiral. An example of a conveying system wherein the belt is self-supporting on both edges is that shown in U.S. Pat. No. 3,938,651, whose entire contents are hereby incorporated by reference. A disadvantage of having the belt being self-supported on the outside edge however is that it is not open at the outside to provide good circulation with cooling or freezing air. Thus, another design is shown in European Patent Application Publication No. 0.293.095.A1 of Cawley, whose entire contents are hereby incorporated by reference. In this application, the tiers at the outside of the helix are supported by a fixed helical guide which is open between the tiers and the inside of the helical belt is self-supported by upstanding spacer plates mounted to articulated belt links.

When the belt is self-supporting on one or both sides, structure is needed to support the lowermost tier of the belt at those edges. The angle or pitch of this lower support tier determines the pitch of the rest of the helical conveying path. A known way for supporting the lowermost tier, which is disclosed in the '651 patent, provides a supplemental conveyor which drives the lowermost tier. Another known way for supporting the lowermost tier, which is disclosed in the Cawley application, supports the tier on a stationary support which may include small rollers.

The conveyor belt through the helical portion thereof can be driven by a drive cage centrally located within the helical belt. The cage has a plurality of vertical driving bars which engage the heads of the bars of the belt and when rotated by an electric motor drive the belt along its helical path. Supplemental positive drives are provided at the inlet and outlet of the conveyor belt relative to the helical portion, that is at both ends of the belt return path, and synchronized with the drive of the drive cage for smooth even belt travel. Such a positive drive helical conveyor system is shown for example in U.S. Pat. No. 4,741,430, which is hereby incorporated by reference.

SUMMARY OF THE INVENTION

Accordingly, a principal object of the present invention is to provide an improved helical conveyor system.

Another object of the present invention is to provide a more compact helical conveyor system, especially one which is used to cool or freeze the conveyed products.

A further object of the present invention is to provide an improved support system for the lowest tier of a helical conveying system whose inner helical belt edge is self-supporting.

Directed to achieving these objects, an improved helical conveying system is herein provided. The helical portion of the endless belt for this system is supported at its outer edge by a helical rail. The inner edge is self-supporting, and an improved system for supporting the lowermost tier thereof is herein disclosed. The support system includes a continuous rail helically formed through between approximately two hundred and seventy and three hundred and fifty degrees of its path, or about three hundred degrees for a five foot diameter rail, and having a short downwardly sloping portion smoothly connecting the lower and upper ends thereof. A series of trolleys ride on their flanged wheels on this rail about its continuous circuit. The trolleys are connected to the drive cage so that when the drive cage rotates and drives the conveyor belt along its helical path, the trolleys are driven along the rail. The axis of one of the wheels of each of the trolleys extends a distance from the adjacent end of the support trolley portion so that when the trolley moves over the uppermost end of the connector rail portion the main trolley portion does not rise to cause the conveyor belt to bump up.

In a helical conveyor wherein the belt enters the helix at the bottom, the trolleys carry the conveyor belt up and along the helical path. When the trolleys reach the upper end of their helical rail path they drop off down the connector portion and the conveyor belt is carried a short distance then by a support transition plate. The belt slides off of the transition plate and is self-supporting at its inner edge for the remainder of the helical path. Alternatively, in a helical conveyor of this invention wherein the belt enters the helix at the top, the belt is self-supporting at its inner edge until it reaches the lowest tier. The belt then slides onto the transition plate as the trolleys reach the lower end of their helical rail path and rise up the connector portion. The belt slides off the transition plate onto the trolleys at the upper end of their helical rail path, and the trolleys carry the belt down and along the helical rail path until the belt exits the helix.

The conveyor belt as it leaves the helical path is carried away by end support rails to the return path portion. The slack is kept out of the return path portion by an off-center, horizontal tensioning means. If the return path is relatively short only a single supplemental drive for the conveyor may be needed, and it is positioned just prior to the tensioning means.

Other objects and advantages of the present invention will become more apparent to those persons having ordinary skill in the art to which the present invention pertains from the foregoing description taken in conjunction with accompanying drawings.

DETAILED DESCRIPTION OF PREFERRED EMBODIMENTS OF THE INVENTION

Figure 1:
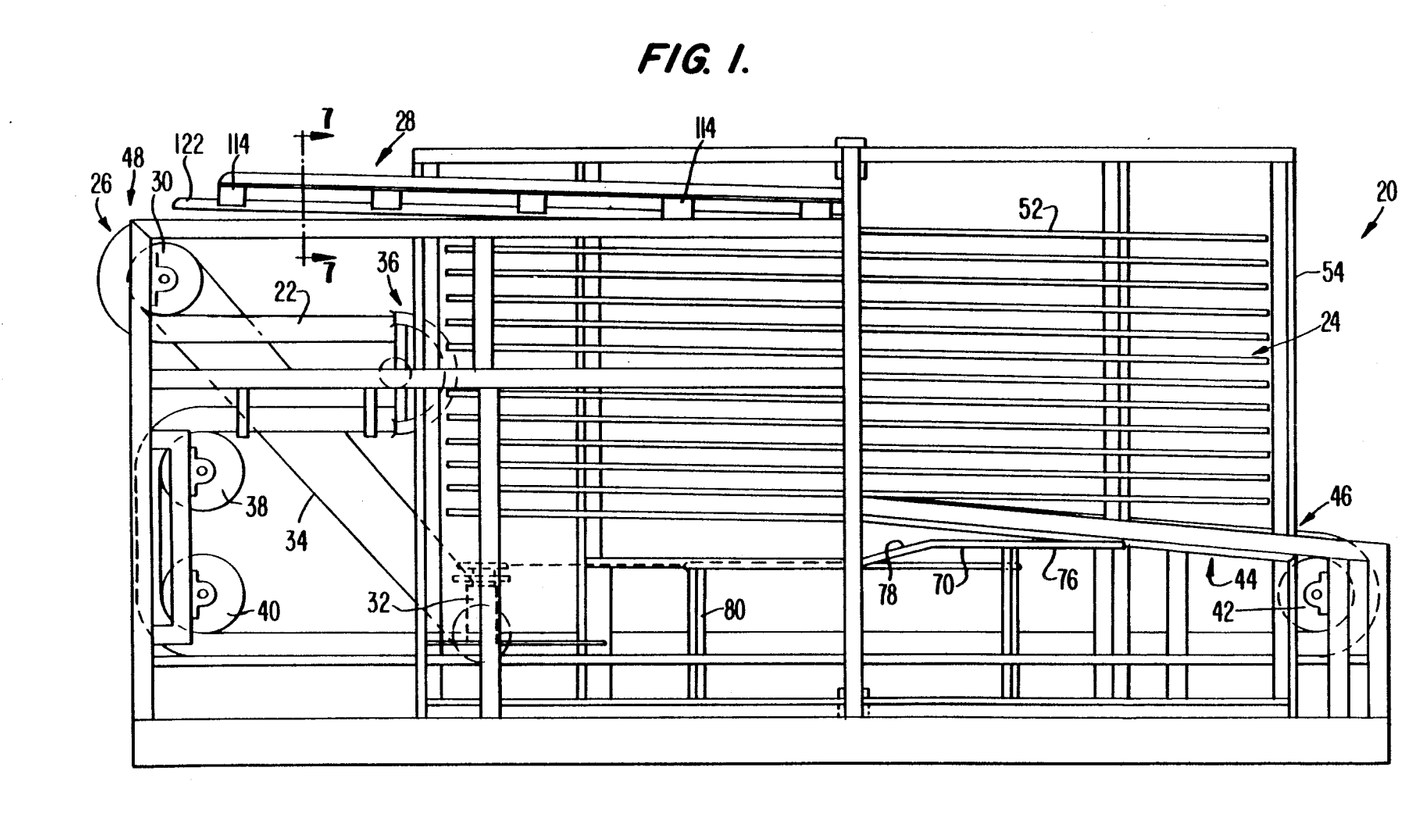
FIG. 1 is an elevational view of a conveying system of the present invention.

A conveying system of the present invention is illustrated in FIG. 1 generally at 20. Conveying system 20 includes a conveyor belt 22 which is supported and driven to travel through a helical portion 24 and a return portion 26 of its endless path. The belt 22 after traveling through the helical portion 24 leaves the path via an exit rail assembly shown generally at 28. It then travels around a supplemental drive sprocket 30 driven by a motor 32. The chain 34 of this supplemental drive as shown in dotted lines in FIG. 1 defines a long oval loop from the motor 32 to the drive sprocket 30. The belt 22 then is flipped over by the sprocket 30 and passes around a slack takeout system shown generally at 36 and thereby flipped back over, travels horizontally a distance, then vertically along a pair of idler wheels 38, 40 and then horizontally the length of the conveying system 20 where it travels up and around idler wheel 42 to enter the bottom tier support system shown generally at 44. Product loading and unloading stations for the belt can be located generally at 46 and 48, respectively. It is also within the scope of this invention to reverse the positions of the loading and unloading stations and have the belt (and products thereon) travel down the helical path.

The belt 22 is preferably a single pitch design as disclosed in the '834.3 European application and can be an adaptation of the "Space Saver Omni-Grid Belt" introduced in January of 1989 by Ashworth Bros., Inc. As will be described later and is disclosed European application, the belt 22 is self-supporting on its inner edge on a series of stacker plates 50. By stacking the belt 22 on the inside, no member coming across the belt 22 to support it and thereby reduce the product carrying vertical space of the belt is needed. The belt 22 is supported along the helical path 24 at its outer edge by a helix rail 52. The helix rail 52, which can be about two hundred feet long, is attached to the upright framework 54 of the conveyor system. Support for the stacked inner belt 22 is provided at the lowest tier of the inner belt edge by the support system 44.

At the inside, the tiers are supported one on the other by an arrangement which includes articulated links 56 at least some of which include the upstanding plate spacers or stacker plates 50. The tops 58 of the plates 50 at any one tier engage the underside of the links or plates associated with the tier immediately above. The inside edge of the conveyor belt 22 is driven up and along its helical path by the centrally-located drive cage shown generally at 60 and as is disclosed for example in the previously-mentioned '430 patent or the '384.3 application. As disclosed therein, the belt in the spiral is driven along only the inside edge of the belt and the outside edge of the belt expands while the inside edge does not collapse. Significant belt tension thus can be created along the inside edge. The framework 54 is shown along the outer edge of FIG. 2. A round mechanical tubing 62 rotatable within a sleeve 64 in the framework defines the vertical axis about which the drive edge 60 is rotatable. The drive cage 60 includes a plurality of circumferentially spaced, vertical drive bars 64. The drive bars 64 are driven through suitable linkages and an electric motor about this vertical axis. The cage 60 is advantageous as it adds stability to the conveying system 20 and makes it less likely for the whole stack of conveyor belt in the helical path 24 to topple over. Ribs in the centers of the bars 64 engage the ends of the rods 69 of the belt 22 to drive the belt up the helical path 24 in a known manner.

Figure 2:
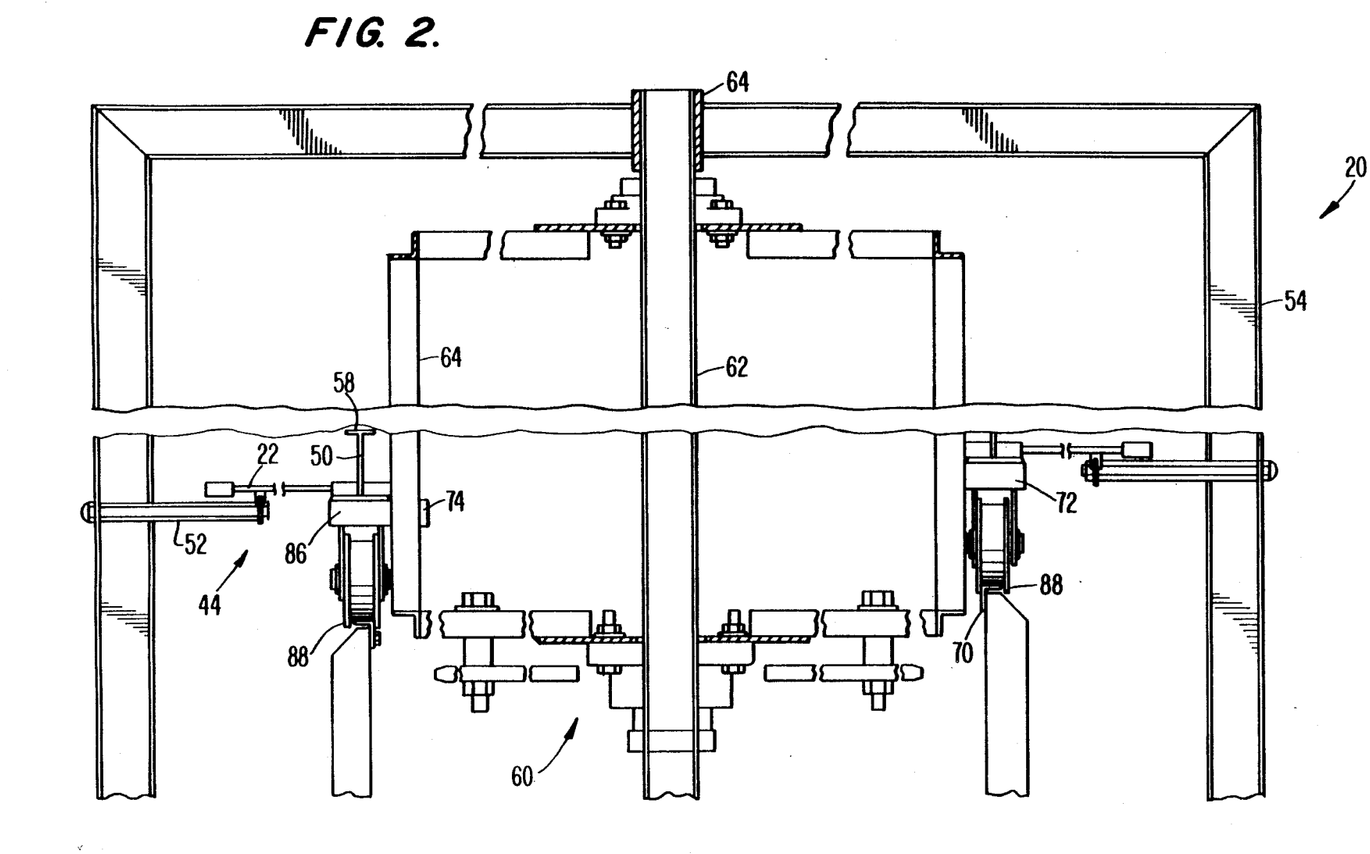
FIG. 2 is a longitudinal sectional view of the system of FIG. 1.
Figure 3:
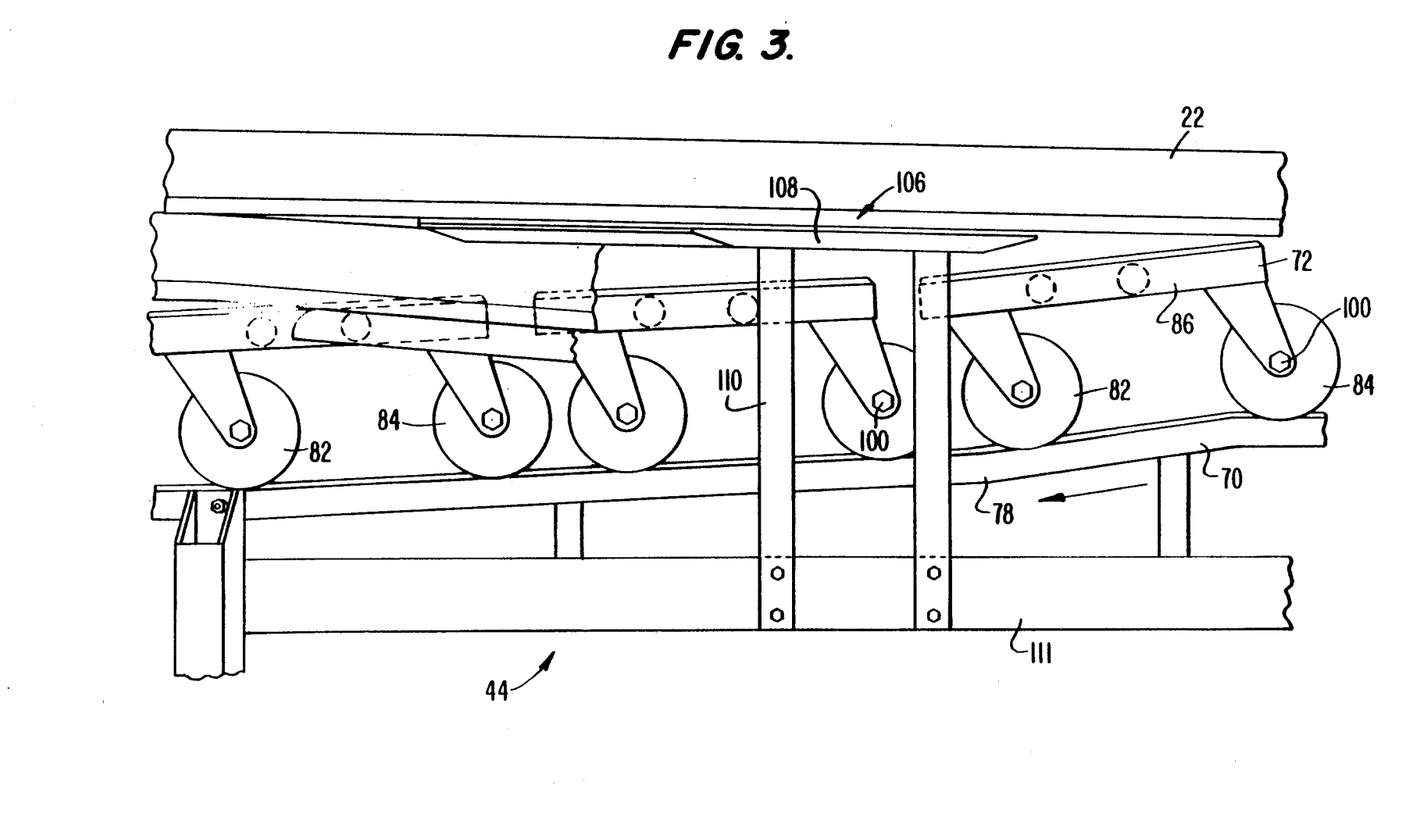
FIG. 3 is an enlarged fragmentary view of a portion of the trolley assembly of the system of FIG. 1.
Figure 4:
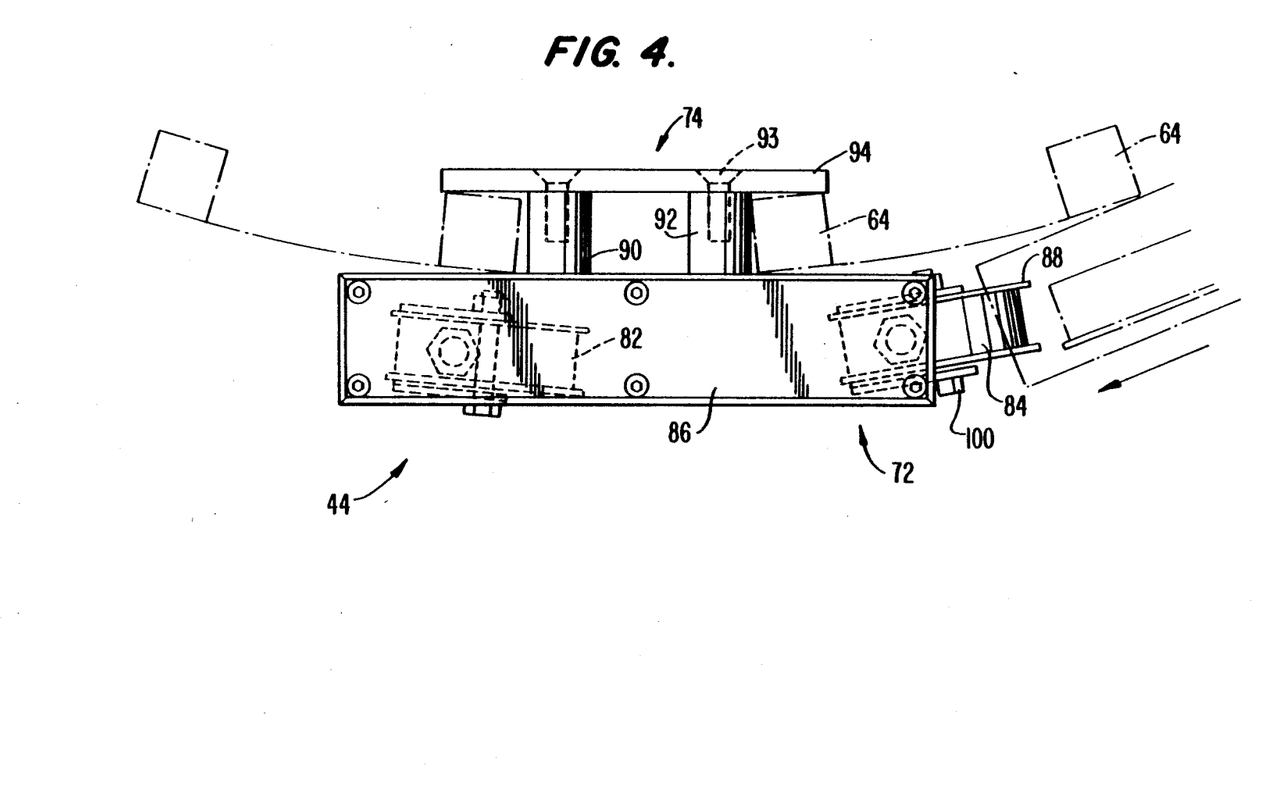
FIG. 4 is a top plan view of the trolley assembly of FIG. 3.
Figure 9:
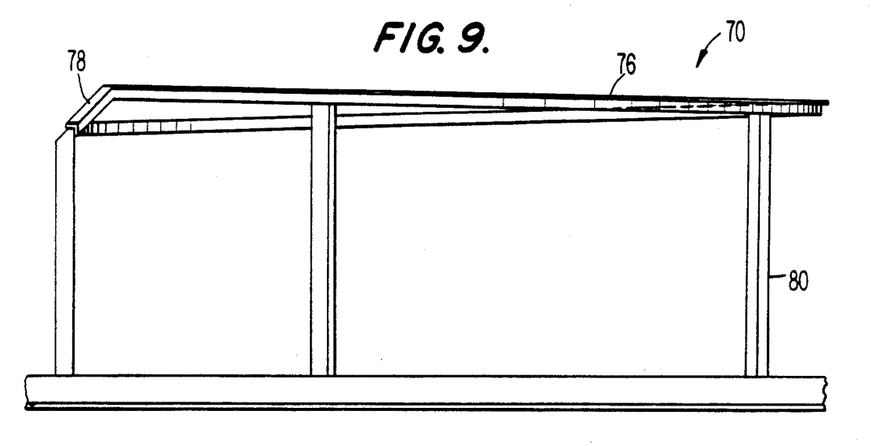
FIG. 9 is an end elevational view of the trolley support rail of the system of FIG. 1 and shown in isolation.
Figure 10:
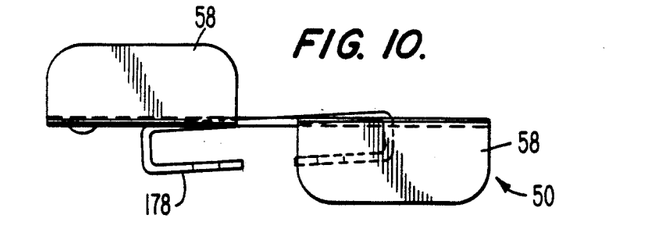
FIG. 10 is a top plan view of an alternative, preferred spacer plate for the conveyor belt of FIG. 8.

The support system 44 is comprised of three components, namely, a support rail as best shown in isolation in FIG. 9 at 70, a series of trolleys shown generally at 72 in FIGS. 2, 3 and 4, and a connector assembly shown generally at 74 in FIG. 4. The connector assembly 74 drivingly connects the trolleys 72 to the drive bars 64 of the drive cage 60 such that when the drive cage is rotated the trolleys are driven along the rail 70. The rail 70 defines a complete circle about the vertical axis of the drive cage 60 and consists of two parts. The first part 76 travels the major part of the turn of between two hundred and seventy and three hundred and sixty degrees and is shaped as an upwardly spiraling helix. The second minor part 78 defines a sloping transition section whereon the trolleys descend to the lower starting point of the helix. The rail 70 comprised of these first and second parts 76 and 78 is supported on stanchions 80.

Front and rear wheels 82, 84 of the trolley 72 support the support member 86 of the trolley. The wheels 82, 84 have flanges 88 which lap over the sides of the flat rail 70 to hold the wheels on the rail. The connector assembly 74, as best shown in FIG. 4, includes a pair of posts 90, 92 spaced horizontally, extending out from the trolley support member 86 and positioned adjacent and between adjacent drive bars 64 of the drive cage 60. A slider bar 94 secured to the ends of both of these posts 90, 92 by fasteners 93 slidingly engages the inner surfaces of the vertical drive bars 64. Thus, the drive cage 60 as it rotates drives the trolleys 72 along the entire circuit of the rail 70 while allowing the trolleys to travel up and down along the helical and sloping portions 76, 78 of the rail 70. The trolleys 72 slide up and down on the drive bars 64, and thus the bars 64 keep the trolleys 72 from falling off of the rail 70.

The trolleys 72 pivot as they drop down about their rear axles 100. When the trolley 72 turns about the pivot point of the rear axle 100 any portion of the trolley located behind that point moves initially up instead of down thereby causing a bump in the belt 22 every time the front of the trolley drops down and the back kicks up. To prevent the rear portion of the conveyor belt support member 86 from bumping up as the trolley 72 travels down the connector rail portion 78 the rear axle 100 is positioned by the bracket 102 behind the rearmost portion of the support member.

As one of the trolleys 72 is driven to the starting point of the helical rail portion 76 it picks up the corresponding portion of the conveyor belt 22 and carries it to the top of the helical portion 76. The trolley 72 then drops down along the connector rail portion 78, and the conveyor belt 22 slides onto the transition plate, which is shown generally at 106 in FIG. 3. The plate 106 includes an upper plate member 108 held above the trolleys 72 by a pair of support posts 110 secured at the lower ends to a curved plate 111 welded to the stanchions 80. The conveyor belt 22 as it next leaves the transition plate 106 is self-supporting along its inner edge on its support plates 50 as it travels up the helical path driven by the drive cage 60.

Figure 7:
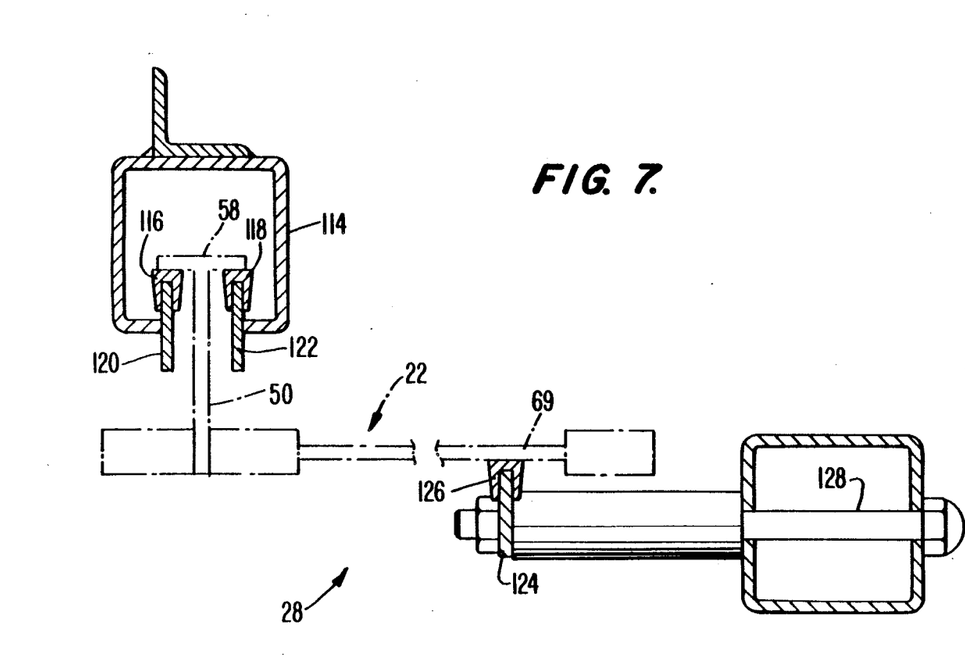
FIG. 7 is an enlarged cross-sectional view taken on line 7—7 of FIG. 1.

As the conveyor belt 22 leaves the top end of the helical path 24 it is lifted thereoff by the rail assembly 28. In particular, FIG. 7 shows the conveyor belt 22 supported as it exits the helical path 24 on rail assembly 28. On the left-hand side, it is supported with short tubes 114 welded to the conveyor framework. Wear strips 116, 118 are provided on the lift rails 120, 122 supported inside of the tubes 114 for supporting thereon the T-shaped stacker plates 50 of the conveyor belt 22. By stacking the belt 22 up until it exits it must cross back over the tier below. Thus, the belt 22 cannot be supported from underneath since it is still over the tier below. It also cannot stack further since it will pull right off the stacks. Thus, after pulling it off the stack, it must be supported until it passes across the tier beneath and away from the stack. This support is provided according to this invention underneath by strips 116, 118 on the rails 120, 122. This is similar to the way that some barn doors slide, except that instead of a wheel on each side there is a tab riding on plastic. The exit rail assembly 28 maintains a clear space between one tier and the next, and no product conveying space is thereby lost. The opposite edge of the conveyor belt 22 rides on a bar 124 of the helix rail 52 having a plastic cap 126. The bar 124 extends up from the end of a long rod 128 threaded through a frame 130.

Figure 5:
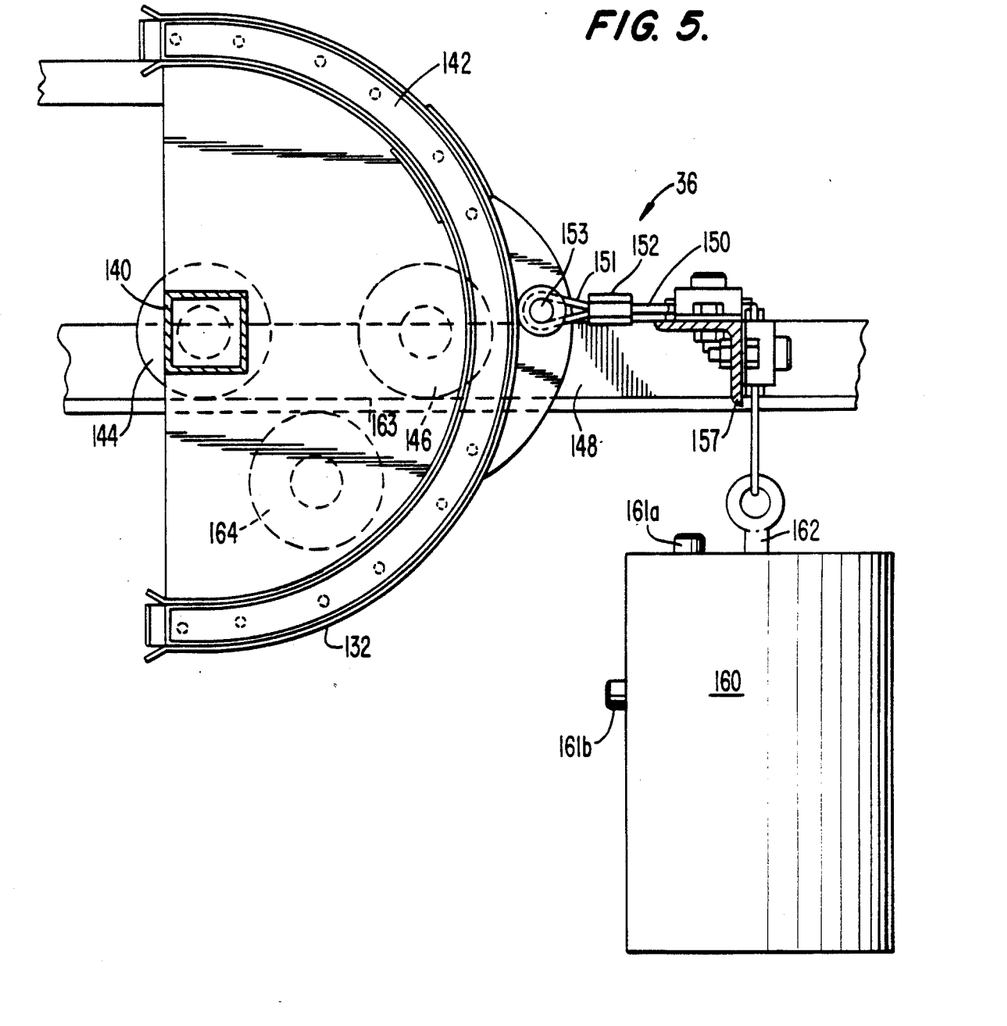
FIG. 5 is an enlarged elevational view of the slack take-out system of the system of FIG. 1, with the belt and anti-torsion wheels thereof omitted for the sake of clarity.
Figure 6:
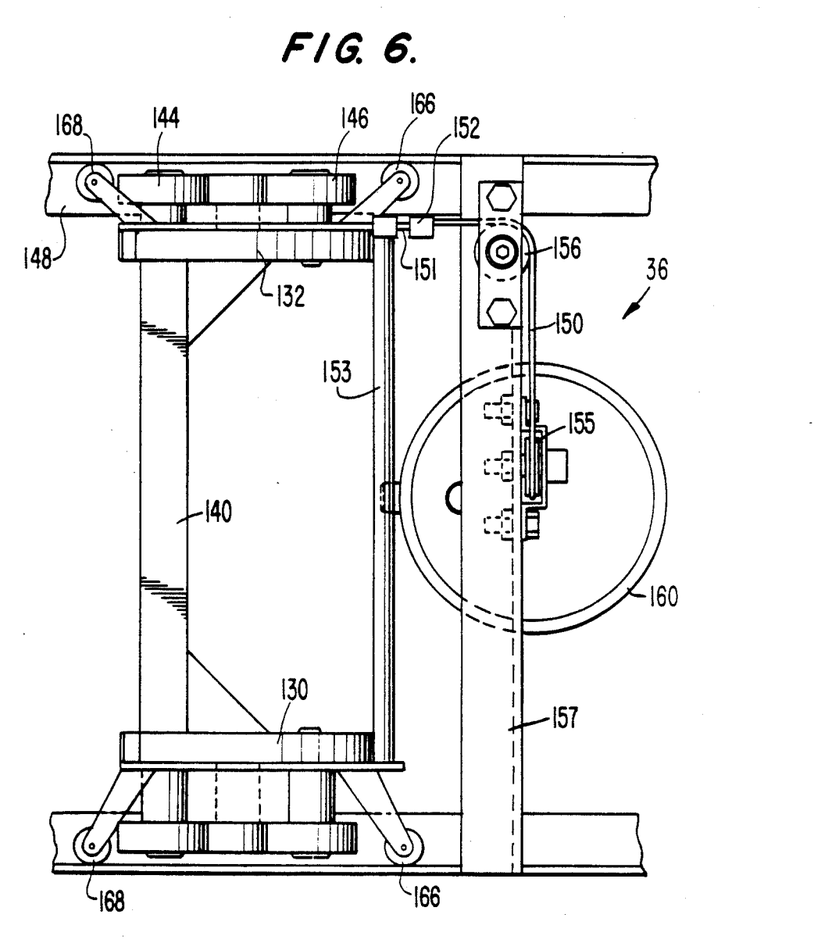
FIG. 6 is a top plan view of the slack take-out system of FIG. 5, with the belt thereof omitted for the sake of clarity.

The slack is taken out of the conveyor belt 22 as it travels along the return path 26 by the slack take-out system 36 shown in FIGS. 1, 5 and 6. The belt 22 as it travels around the half-circle shaped members 130, 132, as shown in FIGS. 1, 5 and 6, carries tension on one side and is slack on the other side. This is because the belt 22, which is driven only along its inside edge, changes shape as it goes from running straight to around a lateral curve such as in a spiral. Also, the belt 22 is in a reverse bend here so that the plates 50 instead of folding out as they are going around are crowded in towards one another. The present take-up system 36 applies off-set back tension to the belt 22 to take this slack out.

At the half-circle shaped members 130, 132 the belt 22 thus makes a backwards bend. An idling wheel or a sprocket will not fit in the edge of the belt since the plates 50 are in the way. Instead the present system 36 includes the two half-circle groove members 130, 132 and a framework 140 to hold the members apart a distance slightly greater than the width of the belt 22. The grooves are coated with a strip 142 (or spaced wear blocks) of friction reducing plastic so that the belt 22 can travel freely in them. The framework 140 can move horizontally on a pair of attached wheels 144, 146 rolling on a fixed rail 148.

A tension cable 150 is hooked to the C-shaped member 132 on the belt tension side by a cable loop 151 formed by a wire rope clip 152 and looping over lateral pipe 153. The cable 150 extends over sheaves 155 and 156 secured to cross-bar 157 to a downwardly-depending weight 160, whose weight is adjustable through material ports 161a and 161b, where it hooks to an eye bolt 162 attached to the top of the weight. The weight 160 acting through the cable 150 pulls the C-shaped members 130, 132 horizontally against the overlying belt 22 thereby tensioning the belt. In other words, when slack occurs in the belt 22 the C-shaped members 130, 132 are moved on their wheels 144, 146 to the right as depicted in FIGS. 5 and 6, and when the slack disappears movement is to the left. The attachment of the cable loop 152 to the C-shaped member 132 is above the rolling surface 163 of the wheels 140, 146 on the rail 148. To prevent tipping (in a clockwise direction as can be understood from FIG. 5) a third wheel 164 is attached to the framework 140 and rides underneath and presses against the lower surface of the rail 148.

Figure 8:
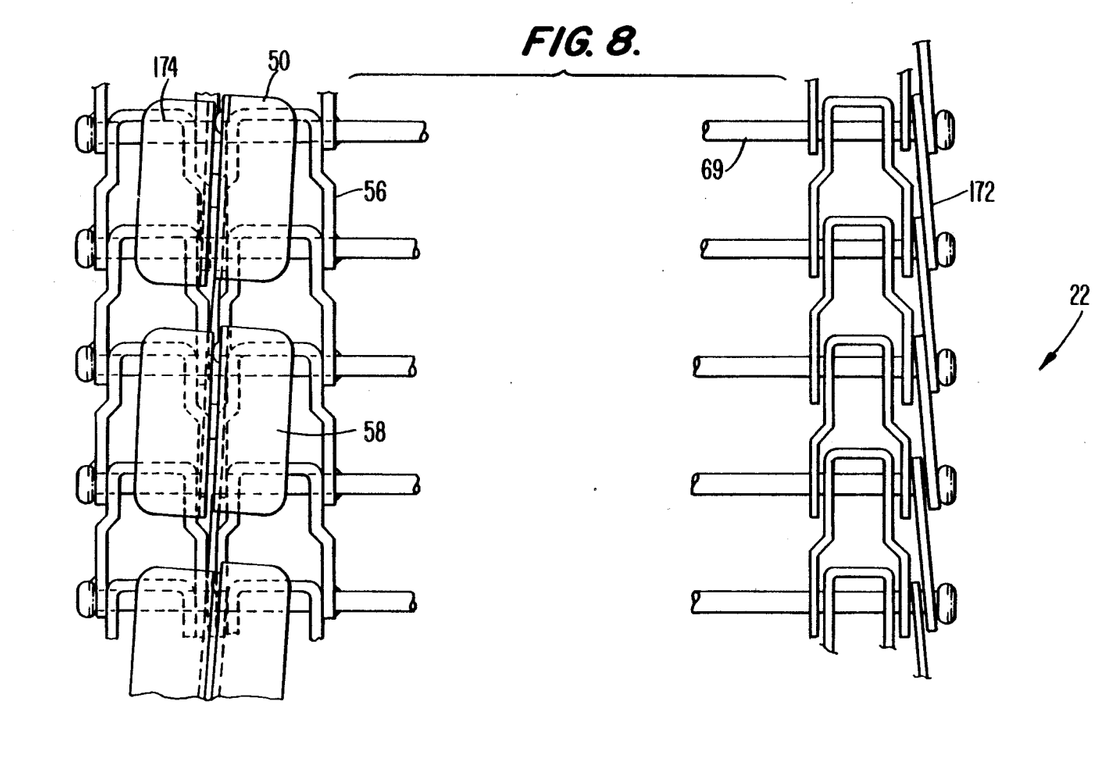
FIG. 8 is an enlarged, fragmentary plan view of a portion of the conveyor belt of the system of FIG. 1.
Figure 13:
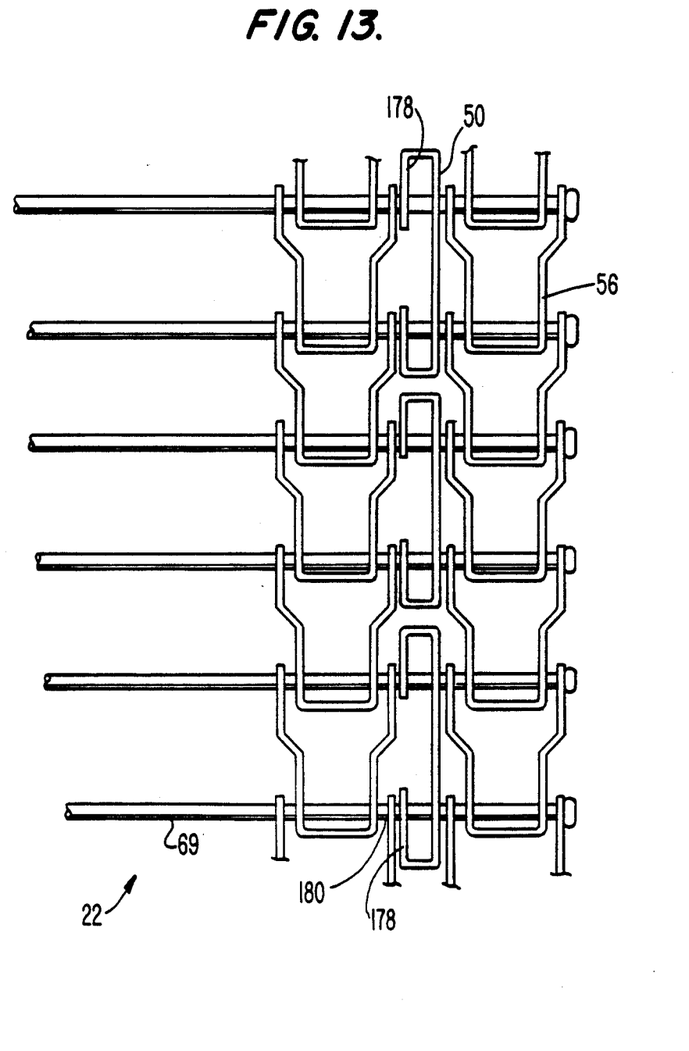
FIG. 13 is a bottom plan view of a portion of a conveyor belt similar to that of FIG. 8 and using the spacer plate of FIGS. 10-12.

The cable 150 is attached to the framework 140 offset from the centerline thereof to accommodate the greater tension on one belt edge. The force applied by weight 160 along the line of cable 150 thus provides a balancing force aligned with the tension carrying portion of the belt. Ideally, the belt tension is shared equally between the two rows of generally U-shaped inside links, which are best shown in FIGS. 8 and 13. In practice however, slight variations in the manufacture of the links 56 can make for an uneven and varying sharing of the tension by the belt when operated. If the cable 150 is not perfectly aligned with the effective line of the belt tension force, twisting forces are exerted on framework 140. These forces are handled according to the invention by leading and trailing anti-torsion wheels 166, 168 extended out from the C-shaped members 130, 132 and riding on the fixed rails, as can be seen in FIG. 6.

The conveyor belt 22 itself as shown best in FIG. 8 includes the transverse rods 69 interconnected by links 56 disposed along opposite transverse edges of the belt. The preferred "shingling" of the bar links 172 is illustrated in FIG. 8. Two rows of spacer plates 50 are sandwiched in the links. The plates 50 are bent over forming tabs 174, which define the plate tops 58, on which the next layer of belt 22 is stacked in the helical path 24. The two rows of links 56, on the left-hand side of FIG. 8, are close together.

Figure 11:
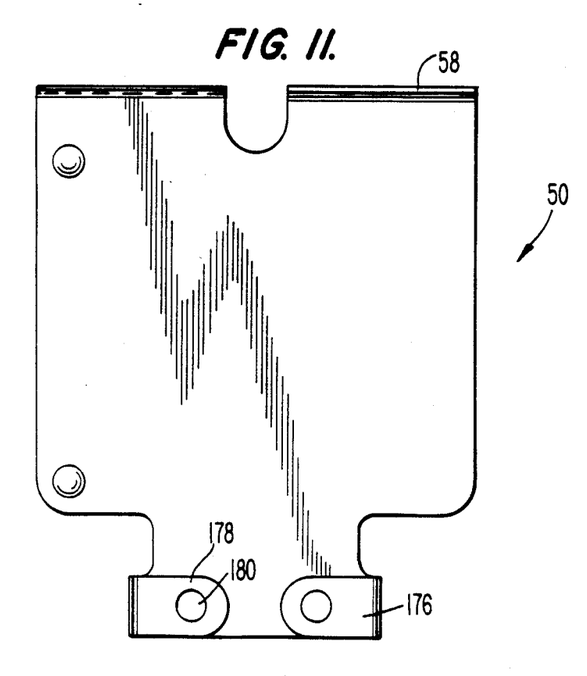
FIG. 11 is a side elevational view of the spacer plate of FIG. 10.
Figure 12:
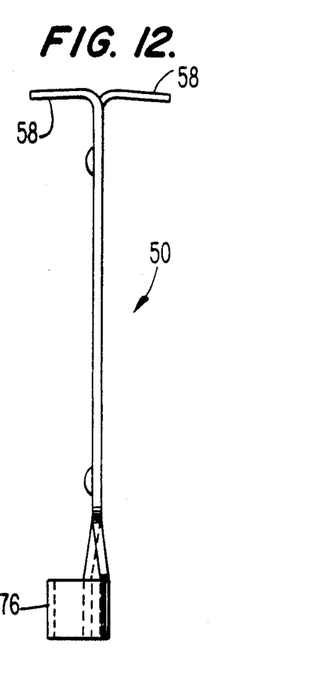
FIG. 12 is an end elevational view of the spacer plate of FIG. 10.

Thus, an alternative preferred configuration of the plates 50 has the bottom tab 176 thereof bent around in an angled C-shaped pattern or footprint 178 as shown in FIGS. 10–13. This provides a bigger footprint, as can be best appreciated from FIG. 13, than just an edge view of a piece of sheet metal to help hold the plate 50 upright, and the C-shaped footprint 178 thereby makes the spacer plates 50 more self-supporting. The two rows of inside links 56 accordingly need not be squeezed so tightly together to hold the plates 50 upright. This C-shaped footprint 178 also makes it easier to clean the belt 22. The ends of the rods 69 pass through the throughholes 180 in the tabs, as shown in FIGS. 11 and 13. Spacer plates with this C-shaped footprint 178 configuration can also be used in two-edged stacking belts.

These stacked plates 50 support the entire belt 22 at the inside of the helical path 24 without the need for a separate inner support rail. The tension in this belt 22 is carried by the inner edge links 56 which do not collapse when the belt goes into a turn. The outer edge of the belt 22 which is supported by the helix rail 52 opens up as the belt 22 goes into the turn but remains slightly loose and does not carry the belt tension. A snug fit of the belt's inner diameter around the driving drum cage 60 and an easier transition of the stacking inner edge as it enters and leaves the helical path 24 are thereby provided.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

What is claimed is:

1. An endless conveyor belt comprising:
   a plurality of transverse rods having rod ends;
   a plurality of links connected to said rods; and
   stacker plates between said links, said plates including a longitudinal portion having upper and lower sections, a pair of tab portions extending in opposite transverse directions from upper ends of said upper section, said lower section including a member extending generally out from the plane of said upper section and defining a C-shape in a member plane perpendicular to said plane of said upper section, and said C-shape member having a pair of arms through which a pair of through holes pass and through which said rod ends pass.

2. The endless conveyor belt of claim 1 wherein said C-shape member is angled slightly relative to said plane.

3. A spacer plate for a conveyor belt having transverse rods and support links, said spacer plate including a longitudinal portion having upper and lower sections, a pair of tab portions extending in opposite transverse directions from upper ends of said upper section, and a pair of through holes through lower ends of said lower sections for receiving ends of the transverse rods, wherein the improvement comprises:
   said lower section including a member extending generally out from the plane of said upper section and defining a C-shape in a member plane perpendicular to said plane of said upper section; and
   said C-shape member having a pair of arms through which said through holes pass.

4. The spacer plate of claim 3 wherein said C-shape member is angled slightly relative to said plane.

* * * * *